US012524171B2

(12) United States Patent
Achkinazi et al.

(10) Patent No.: US 12,524,171 B2
(45) Date of Patent: Jan. 13, 2026

(54) STORAGE SYSTEM WITH AUTOMATED FILTERING OF DISCOVERY INFORMATION UTILIZING SPECIFIED CONFIGURATION DOMAINS

(71) Applicant: Dell Products L.P., Round Rock, TX (US)

(72) Inventors: Igor Achkinazi, Northborough, MA (US); David L. Black, Acton, MA (US); Lev Knopov, Brookline, MA (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/335,240

(22) Filed: Jun. 15, 2023

(65) Prior Publication Data
US 2024/0419347 A1    Dec. 19, 2024

(51) Int. Cl.
G06F 3/06    (2006.01)

(52) U.S. Cl.
CPC .......... *G06F 3/0634* (2013.01); *G06F 3/0604* (2013.01); *G06F 3/0659* (2013.01); *G06F 3/067* (2013.01)

(58) Field of Classification Search
CPC ...... G06F 3/0604; G06F 3/0659; G06F 3/067; G06F 3/0634
USPC ......................................................... 711/154
See application file for complete search history.

(56) References Cited

U.S. PATENT DOCUMENTS

| | | |
|---|---|---|
| 10,310,760 B1 | 6/2019 | Dreier et al. |
| 10,893,105 B1 | 1/2021 | Bono et al. |
| 11,550,511 B2 | 1/2023 | Mallick et al. |
| 2003/0149773 A1 | 8/2003 | Harbin et al. |
| 2009/0154472 A1 | 6/2009 | Chung et al. |
| 2013/0198312 A1 | 8/2013 | Tamir et al. |

(Continued)

OTHER PUBLICATIONS

Storpool Storage, "Demystifying: What is NVMeOF?" https://storpool.com/blog/demystifying-what-is-nvmeof, Sep. 12, 2017, 4 pages.

(Continued)

*Primary Examiner* — Gautam Sain
(74) *Attorney, Agent, or Firm* — Ryan, Mason & Lewis, LLP

(57) ABSTRACT

An apparatus comprises at least one processing device that includes a processor coupled to a memory. The at least one processing device is configured to receive a command providing a configuration domain identifier specifying a corresponding one of a plurality of configuration domains of a storage system, to establish a configuration domain filtering instance in the storage system responsive to the received command, and to automatically filter discovery information for delivery from the storage system to at least one host in accordance with the established configuration domain filtering instance. For example, establishing a configuration domain filtering instance in the storage system responsive to the received command illustratively comprises activating a configuration domain filtering feature of the storage system, utilizing the provided at least one configuration domain identifier, for subsequent provision of filtered discovery information from a target of the storage system to an initiator of a given host.

20 Claims, 11 Drawing Sheets

(56) References Cited

U.S. PATENT DOCUMENTS

| | | | |
|---|---|---|---|
| 2013/0226887 | A1 | 8/2013 | Braam et al. |
| 2015/0012607 | A1 | 1/2015 | Cayton et al. |
| 2017/0177222 | A1 | 6/2017 | Singh et al. |
| 2019/0042144 | A1* | 2/2019 | Peterson ............... G06F 3/0635 |
| 2020/0019521 | A1 | 1/2020 | Solanki et al. |
| 2020/0026606 | A1 | 1/2020 | Farnum et al. |
| 2021/0397351 | A1* | 12/2021 | Dhatchinamoorthy ..................... G06F 3/0607 |
| 2021/0405902 | A1* | 12/2021 | Sangle ................... G06F 3/067 |
| 2022/0374167 | A1 | 11/2022 | Mallick et al. |

OTHER PUBLICATIONS

VMware, "VMware ESX Server," Product Datasheet, 2007, 4 pages.
Wikipedia, "Host Adapter," https://en.wikipedia.org/wiki/Host_adapter, Jul. 19, 2021, 4 pages.
Wikipedia, "iSCSI," https://en.wikipedia.org/wiki/ISCSI, Dec. 22, 2021, 10 pages.
Wikipedia, "NVM Express," https://en.wikipedia.org/wiki/NVM_Express, Jan. 13, 2022, 18 pages.
A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.
Wikipedia, "Remote Direct Memory Access," https://en.wikipedia.org/wiki/Remote_direct_memory_access, Jan. 30, 2021, 3 pages.
M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.
EMC Corporation, "EMC ScaleIO Architectural and Functional Overview," EMC White Paper, Dec. 2013, 13 pages.
Dell EMC, "Dell EMC VxFlex OS: Networking Best Practices and Design Considerations," Dell EMC White Paper, Jul. 2018, 38 pages.
R. Kerns, "What is Block I/O?" searchstorage.techtarget.com/answer/What-is-block-I-O, Oct. 19, 2005, 2 pages.
Janalta Interactive, "Client-Side" https://www.techopedia.com/definition/439/client-side, Accessed Jan. 14, 2022, 8 pages.
EMC Corporation, "EMC ScaleIO Design Considerations and Best Practices," EMC White Paper, Jun. 2016, 30 pages.
Mellanox Technologies, "Roce vs. iWARP Competitive Analysis," White Paper, Feb. 2017, 6 pages.
NVM Express, "NVM Express Base Specification, Revision 2.0c," NVM Express, Oct. 4, 2022, 458 pages.
U.S. Appl. No. 17/578,609 filed in the name of Xiangping Chen et al. filed Jan. 19, 2022, and entitled "Intelligent Target Routing in a Distributed Storage System."
U.S. Appl. No. 17/696,360 filed in the name of Sanjib Mallick et al. on Mar. 16, 2022, and entitled "Intelligent Path Selection in a Distributed Storage System."
U.S. Appl. No. 17/714,312 filed in the name of Igor Achkinazi et al. on Apr. 6, 2022, and entitled "Storage System with Multiple Target Controllers Supporting Different Service Level Objectives."
U.S. Appl. No. 17/716,118 filed in the name of Igor Achkinazi et al. filed Apr. 8, 2022, and entitled "Host-Based Locality Determination for Logical Volumes Stored Across Multiple Nodes of a Distributed Storage System."
U.S. Appl. No. 17/964,560 filed in the name of Igor Achkinazi et al. filed Oct. 12, 2022, and entitled "Host-Based Locality Determination Using Locality Log Pages."

* cited by examiner

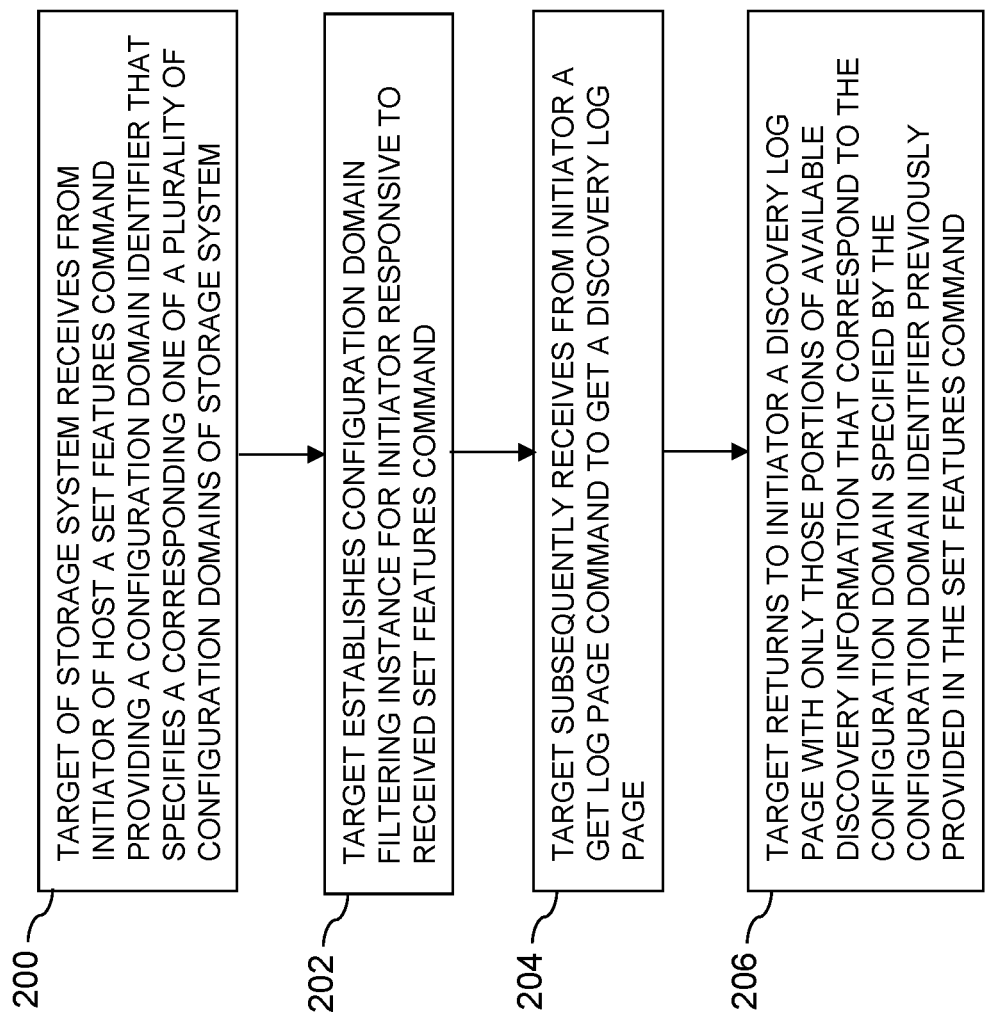

STORAGE SYSTEM WITH AUTOMATED FILTERING OF DISCOVERY INFORMATION UTILIZING SPECIFIED CONFIGURATION DOMAINS

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage object view to allow a given application to store and access data, without the application being aware that the data is being dynamically distributed among different storage nodes. In these and other software-defined storage system arrangements, it can be unduly difficult to implement target discovery functionality for host initiators when using advanced storage access protocols such as Non-Volatile Memory Express (NVMe) over Fabrics, also referred to as NVMe-oF, or NVMe over Transmission Control Protocol (TCP), also referred to as NVMe/TCP. For example, conventional approaches can require that substantial amounts of discovery information be maintained and continuously updated.

SUMMARY

Illustrative embodiments disclosed herein provide techniques for automated filtering of discovery information, in a software-defined storage system or other type of distributed storage system, illustratively utilizing specified configuration domains. Such techniques advantageously facilitate the usage of advanced storage access protocols such as NVMe-oF or NVMe/TCP while avoiding the above-described drawbacks of conventional practice. For example, some embodiments can substantially reduce the complexity of the discovery process as well as the burdens associated with maintaining and updating discovery information in the distributed storage system.

Although some embodiments are described herein in the context of implementing an NVMe-oF or NVMe/TCP access protocol in a software-defined storage system, it is to be appreciated that other embodiments can be implemented in other types of distributed storage systems using other storage access protocols.

In addition, the disclosed techniques can be implemented in other embodiments in stand-alone storage arrays or other types of storage systems that are not distributed across multiple storage nodes. Accordingly, the disclosed techniques are applicable to a wide variety of different types of storage systems.

In one embodiment, an apparatus comprises at least one processing device that includes a processor coupled to a memory. The at least one processing device is configured to receive a command providing a configuration domain identifier specifying a corresponding one of a plurality of configuration domains of a storage system, to establish a configuration domain filtering instance in the storage system responsive to the received command, and to automatically filter discovery information for delivery from the storage system to at least one host in accordance with the established configuration domain filtering instance.

The at least one processing device illustratively comprises at least a portion of the storage system.

In some embodiments, establishing a configuration domain filtering instance in the storage system responsive to the received command illustratively comprises activating a configuration domain filtering feature of the storage system, based at least in part on the provided at least one configuration domain identifier, for subsequent provision of filtered discovery information from a target of the storage system to an initiator of a given host.

Additionally or alternatively, in some embodiments a target of the storage system receives the command from an initiator of a given host, and the target subsequently receives from the initiator an additional command, and wherein automatically filtering discovery information for delivery from the storage system to at least one host in accordance with the established configuration domain filtering instance comprises returning in response to the additional command only those portions of available discovery information of the target that are associated with the one or more specified configuration domains.

The above-noted target in some embodiments comprises an NVMe discovery controller of the storage system, although it is to be appreciated that other types and arrangements of targets can be used.

In some embodiments, the target comprises multiple controllers accessible via respective different associations comprising one or more TCP connections between the given host and the storage system. For example, the target may comprise a plurality of NVMe controllers of an NVMe subsystem of the storage system. Again, a wide variety of other storage access protocols can be used in other embodiments.

As indicated above, the storage system in some embodiments illustratively comprises a distributed storage system that includes a plurality of storage nodes. The distributed storage system may more particularly comprise, for example, a software-defined storage system in which the storage nodes illustratively comprise respective software-defined storage server nodes of the software-defined storage system.

These and other illustrative embodiments include, without limitation, apparatus, systems, methods and processor-readable storage media.

BRIEF DESCRIPTION OF THE DRAWINGS

FIG. 2 is a flow diagram of a process for automated filtering of discovery information in a distributed storage system in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
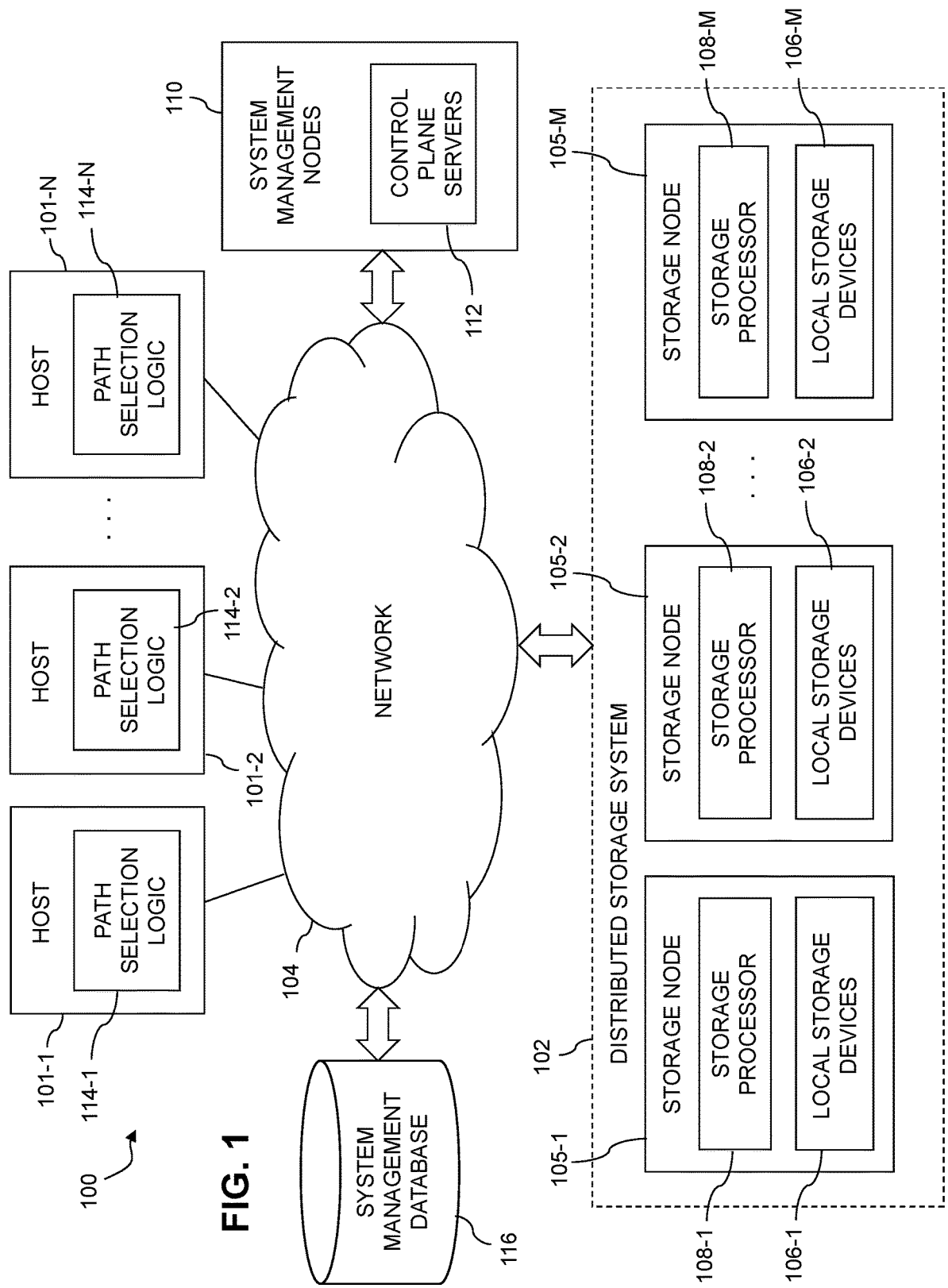
FIG. 1 is a block diagram of an information processing system incorporating functionality for automated filtering of discovery information in a distributed storage system in an illustrative embodiment.

FIG. 1 shows an information processing system 100 configured in accordance with an illustrative embodiment. The information processing system 100 comprises a plurality of hosts 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical identifier (e.g., address) space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards of those devices, that support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE) or RDMA over iWARP.

The first storage node 105-1 comprises a plurality of storage devices 106-1 and an associated storage processor 108-1. The storage devices 106-1 illustratively store metadata pages and user data pages associated with one or more storage volumes of the distributed storage system 102. The storage volumes illustratively comprise respective logical units (LUNs) or other types of logical storage volumes (e.g., NVMe namespaces). The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2, and storage node 105-M comprises a plurality of storage devices 106-M and an associated storage processor 108-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 may include additional modules and other components typically found in conventional implementations of storage processors and storage systems, although such additional modules and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVMe Specification, Revision 2.0c, October 2022, which is incorporated by reference herein. Other examples of NVMe storage access protocols that may be utilized in illustrative embodiments disclosed herein include NVMe over Fabrics, also referred to herein as NVMe-OF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The hosts 101-1, 101-2, . . . 101-N include respective instances of path selection logic 114-1, 114-2, . . . 114-N. Such instances of path selection logic 114 are illustratively utilized in supporting functionality for automated filtering of discovery information in the distributed storage system 102, illustratively through interaction with discovery filtering logic instances implemented in respective one of the storage processors 108 of the storage nodes 105, as described in more detail below.

In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVMe subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic 114 of the hosts 101 for delivering IO operations from the hosts 101 to the distributed storage system 102 are associated with respective initiator-target pairs, as described in more detail elsewhere herein.

In some embodiments, IO operations are processed in the hosts 101 utilizing their respective instances of path selection logic 114 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective instances of path selection logic 114, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues and respective multi-path input-output (MPIO) drivers. The MPIO drivers collectively comprise a multi-path layer of the hosts 101. Path selection functionality for delivery of IO operations from the hosts 101 to the distributed storage system 102 is provided in the multi-path layer by respective instances of path selection logic implemented within the MPIO drivers. In some embodiments, the instances of path selection logic 114 are implemented at least in part within the MPIO drivers of the hosts 101.

The MPIO drivers may comprise, for example, otherwise conventional MPIO drivers, such as PowerPath® drivers from Dell Technologies, suitably modified in the manner disclosed herein to provide one or more portions of the disclosed functionality for automated filtering of discovery information. Other types of MPIO drivers from other driver vendors may be suitably modified to incorporate one or more portions of the functionality for automated filtering of discovery information as disclosed herein.

For example, the instances of path selection logic 114 of the respective hosts 101 can be implemented at least in part in respective MPIO drivers of those hosts.

In some embodiments, such instances of path selection logic 114 include or are otherwise associated with respective corresponding instances of host-side discovery filtering logic that are configured to send commands associated with automated filtering, such as, for example, a Set Features command to set contents of a configuration domain filtering feature and a Get Features command to get contents of a configuration domain filtering feature, to targets of the storage nodes 105 of the distributed storage system 102.

Such host-side discovery filtering logic can be part of an MPIO layer of the hosts 101, or can be implemented elsewhere within the hosts 101.

In some embodiments, the hosts 101 comprise respective local caches, implemented using respective memories of those hosts. A given such local cache can be implemented using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs or other types of logical storage devices.

In some embodiments, the paths are associated with respective communication links between the given host and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the hosts 101 but have respective unique identifiers associated therewith.

Additionally or alternatively, different ones of the multiple virtual initiators are illustratively associated with respective different ones of a plurality of virtual machines of the given host that share a single HBA of the given host, or a plurality of logical partitions of the given host that share a single HBA of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI blocks or other types of blocks. Other command formats, e.g., Submission Queue Entry (SQE), are utilized in the NVMe context.

In illustrative embodiments to be described below, it is assumed without limitation that the initiators of a plurality of initiator-target pairs comprise respective ports of the given host and that the targets of the plurality of initiator-target pairs comprise respective ports of the distributed storage system 102. Examples of such host ports and storage array ports are illustrated in conjunction with the embodiment of FIG. 5. The host ports can comprise, for example, ports of single-port HBAs and/or ports of multi-port HBAs, or other types of host ports, including network interface cards (NICs). A wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the hosts 101 and the distributed storage system 102 in the system 100. For example, the addition of one or more new paths from the given host to the distributed storage system 102 or the deletion of one or more existing paths from the given host to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host to the distributed storage system 102, illustratively utilizing the MPIO driver, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage devices 106. The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

Automated Filtering of Discovery Information

The manner in which functionality for automated filtering of discovery information is implemented in system 100 will now be described in more detail.

As indicated previously, in software-defined storage system arrangements utilizing advanced storage access protocols such as NVMe-oF or NVMe/TCP, it can be unduly difficult to implement target discovery functionality for host initiators. For example, conventional approaches can require that substantial amounts of discovery information be maintained and continuously updated, across the entire distributed storage system. This can include tracking the hosts by identifier globally across the entire storage system, as well as updating that information globally as host-related configuration changes happen (e.g., adding a host, removing a host, migrating a host's storage volumes to a different configuration domain, etc.) Similar issues arise in other types of storage systems.

Illustrative embodiments disclosed herein provide techniques for automated filtering of discovery information, in a software-defined storage system or other type of distributed storage system, illustratively utilizing specified configuration domains. Such techniques advantageously facilitate the usage of advanced storage access protocols such as NVMe-oF or NVMe/TCP while avoiding the above-described drawbacks of conventional practice. For example, some embodiments can substantially reduce the complexity of the discovery process as well as the burdens associated with maintaining and updating discovery information in the distributed storage system.

As mentioned above, each of the storage nodes 105 of the distributed storage system 102 illustratively comprises one or more targets, where each such target is associated with multiple distinct paths from respective HBAs or other initiators of one or more of the hosts 101. Illustrative embodiments disclosed herein configure a given such target to automatically filter discovery information provided to initiators in accordance with specified configuration domains of the distributed storage system 102.

For example, in some embodiments, one or more of the storage nodes 105 each implements at least one target, such as an NVMe target, that is configured to include multiple controllers, such as at least a first controller associated with a first storage pool, and a second controller associated with a second storage pool. The first and second storage pools are illustratively storage pools of the distributed storage system 102, and such storage pools may be distributed across multiple ones of the storage nodes 105. Each of the first and second storage pools is assumed to comprise one or more LUNs or other logical storage volumes.

Although first and second controllers are referred to in conjunction with some embodiments herein, it is to be appreciated that more than two controllers can be implemented in a given target in order to support more than two storage pools.

A given one of the storage nodes 105 illustratively processes IO operations received from one or more of the hosts 101, with different ones of the IO operations being directed by the one or more hosts 101 from one or more initiators of the one or more hosts 101 to different ones of the first and second controllers of the target implemented within the given storage node.

The automated filtering of discovery information in such an embodiment is illustratively implemented in the following manner.

A given one of the hosts 101 illustratively generates a command, such as a Set Features command, to set contents of a configuration domain filtering feature of the type disclosed herein, and sends it over a selected path to the given storage node. In some embodiments, a corresponding target of the given storage node receives the command from an initiator of the given host. The command illustratively provides a configuration domain identifier specifying a corresponding one of a plurality of configuration domains of the distributed storage system 102.

The target of the given storage node establishes a configuration domain filtering instance in the distributed storage system 102 responsive to the received command, and automatically filters discovery information for delivery to the given host in accordance with the established configuration domain filtering instance. The term "filtering instance" as used herein is intended to be broadly construed, so as to encompass, for example, at least one filter configured in accordance with one or more filter parameters.

In some embodiments, the target comprises an NVMe discovery controller, although a wide variety of other types of targets can be used in other embodiments. The term "target" as used herein in the context of a distributed storage system or other type of storage system is therefore intended to be broadly construed.

The target in some embodiments more particularly comprises multiple controllers accessible via respective different associations comprising one or more TCP connections between the given host and the given storage node. For example, the target may comprise a plurality of NVMe controllers of an NVMe subsystem of the given storage node.

A given configuration domain illustratively comprises one or more logical storage volumes. Such a configuration domain in some embodiments is referred to as a "storage group." In some embodiments, the configuration domains comprise respective distinct protection domains, for example, with a higher level of data protection being provided for one of the configuration domains relative to that provided for another one of the configuration domains. Additional or alternative configuration domains can be used, such as domains based on security, access control, availability and/or other characteristics. For example, different security domains can be used to provide storage layout separation in a distributed storage system.

The term "configuration domain" as used herein is therefore intended to be broadly construed. Also, a configuration domain identifier can comprise any type or arrangement of names, alphanumeric strings and/or other information that can be used to identify a particular configuration domain. The term "identifier" as used herein is therefore also intended to be broadly construed.

In some embodiments, establishing a configuration domain filtering instance in the distributed storage system 102 responsive to the received command illustratively comprises activating a configuration domain filtering feature of the given storage node, based at least in part on the provided at least one configuration domain identifier, for subsequent provision of filtered discovery information from the target of the given storage node to the initiator of the given host.

Additionally or alternatively, automatically filtering discovery information for delivery from the target of the given storage node to the initiator of the given host in accordance with the established configuration domain filtering instance comprises sending from the target to the initiator a subset of available discovery information of the target, where the subset includes portions of the available discovery information associated with the one or more specified configuration domains and excludes portions of the available discovery information not associated with the one or more specified configuration domains.

In some embodiments, the target of the given storage node receives the command from the initiator of the given host, and the target subsequently receives from the initiator an additional command, wherein automatically filtering discovery information for delivery from the target of the given storage node to the initiator of the given host in accordance with the established configuration domain filtering instance illustratively comprises returning in response to the additional command only those portions of available discovery information of the target that are associated with the one or more specified configuration domains. The additional command may comprise, for example, a Get Log Page command to get a discovery log page, and the portions of available discovery information of the target that are associated with the one or more specified configuration domains are returned to the initiator in the discovery log page. Other types of commands can be used in other embodiments.

The available discovery information in some embodiments illustratively comprises at least an IP address and a port identifier. Other types of additional or alternative discovery information can be used in other embodiments.

Automated filtering of discovery information as disclosed herein significantly reduces the amount of information that must be maintained and updated by a particular target, such as an NVMe discovery controller. For example, instead of storing and updating global host information, the target instead stores a much smaller set of information relating to configuration domains, resulting in substantially fewer updates.

The other storage nodes 105 are each assumed to be configured in a manner similar to that described above and elsewhere herein for the given storage node.

As indicated above, in some embodiments, multiple controllers are part of a single physical controller subsystem of the given storage node. For example, first and second controllers may comprise respective NVMe controllers of an NVMe subsystem of the given storage node. Such an NVMe subsystem is considered an example of what is more generally referred to herein as a "target" of the given storage node.

An example of such an arrangement will be described in more detail below in conjunction with FIG. 4. Other types of targets comprising multiple controllers supporting automated filtering of discovery information can be used in other embodiments.

The first and second controllers in some embodiments may be viewed as comprising respective "virtual" controllers associated with the single physical controller subsystem of the given storage node.

Additionally or alternatively, the first and second controllers in some embodiments are accessible via respective first and second different associations comprising one or more TCP connections between a given one of the one or more hosts 101 and the given storage node. In such an arrangement, a host accesses the first controller using the first association, and accesses the second controller using the second association. Other types of communication links can be used in other embodiments.

In some embodiments, the first controller comprises a first set of IO queues and the second controller comprises a second set of IO queues, for use in processing IO operations for their respective storage pools.

An additional example of an illustrative process for implementing at least some of the above-described automated filtering functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and ROCE. For example, respective sets of IP links used in data transfer and corresponding messaging could be associated with respective different ones of the routing modules.

The particular features described above in conjunction with FIG. 1 should not be construed as limiting in any way, and a wide variety of other system arrangements implementing automated filtering of discovery information as disclosed herein are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108, system management nodes 110 and instances of path selection logic 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of automated filtering functionality as disclosed herein can be implemented in one or more hosts, in a storage system, or partially in a host and partially in a storage system. Accordingly, illustrative embodiments are not limited to arrangements in which automated filtering functionality is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for automated filtering of discovery information as disclosed herein. This process may be viewed as an example algorithm implemented at least in part by distributed storage system 102 interacting with one or more of the hosts 101. These and other algorithms for automated filtering of discovery information as disclosed herein can be implemented using other types and arrangements of system components in other embodiments.

The process illustrated in FIG. 2 includes steps 200 through 206, and is assumed to be implemented primarily by a target of a given one of the storage nodes 105 of the distributed storage system 102 interacting with an initiator of a given one of the hosts 101. The target in some embodiments comprises an NVMe discovery controllers, although other types and arrangements of targets can be configured to implement automated filtering functionality as disclosed herein. For example, similar processes may be implemented primarily by other targets of the storage nodes 105 interacting with other initiators of the hosts 101.

In step 200, the target of the given storage node receives from the initiator of the given host a Set Features command to set the contents of a configuration domain filtering feature as disclosed herein. The Set Features command provides a particular configuration domain identifier that specifies a corresponding one of a plurality of configuration domains of the storage system. As indicated above, the target in this embodiment illustratively comprises an NVMe discovery controller of a storage system. Additionally or alternatively, the target can comprise, for example, an NVMe subsystem, which is more generally referred to herein as an NVMe target. The NVMe subsystem or other NVMe target in such an arrangement illustratively comprises multiple controllers. An example of multiple controllers of a single physical NVMe subsystem of the storage system will be described in more detail below in conjunction with the illustrative embodiment of FIG. 4A.

In step 202, the target establishes a configuration domain filtering instance for the initiator responsive to the received Set Features command. For example, the target illustratively stores, in association with information indicating an activated configuration domain filtering feature for the initiator, the particular configuration domain identifier for which discovery information is to be returned to the initiator when subsequently requested by the initiator, illustratively via a Get Log Page command. Other embodiments can be configured to include multiple configuration domain identifiers in one or more commands.

In step 204, the target subsequently receives from the initiator a Get Log Page command to get a discovery log page.

In step 206, the target returns to the initiator, responsive to the Get Log Page command received in step 204, a discovery log page with only those portions of the available discovery information that correspond to the configuration domain specified by the particular configuration domain identifier previously provided in the Set Features command.

Steps 200 through 206 are illustratively repeated over time in order to support the automated filtering functionality. Multiple such processes may operate in parallel with one another in order to provide automated filtering functionality for different targets and their corresponding respective storage nodes and for different initiators and their respective corresponding hosts.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing automated filtering of discovery information for one or more hosts and a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for respective different hosts and/or storage nodes.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective path selection logic instances and other related logic instances of the hosts can be implemented in respective containers running on respective ones of the processing devices of a processing platform.

Additional examples of illustrative embodiments will now be described with reference to FIGS. 3 through 5. As mentioned previously, FIG. 3 comprises three figures denoted FIG. 3A, FIG. 3B, FIG. 3C and FIG. 3D, and FIG. 4 comprises two figures denoted FIG. 4A and FIG. 4B.

Figure 3A:
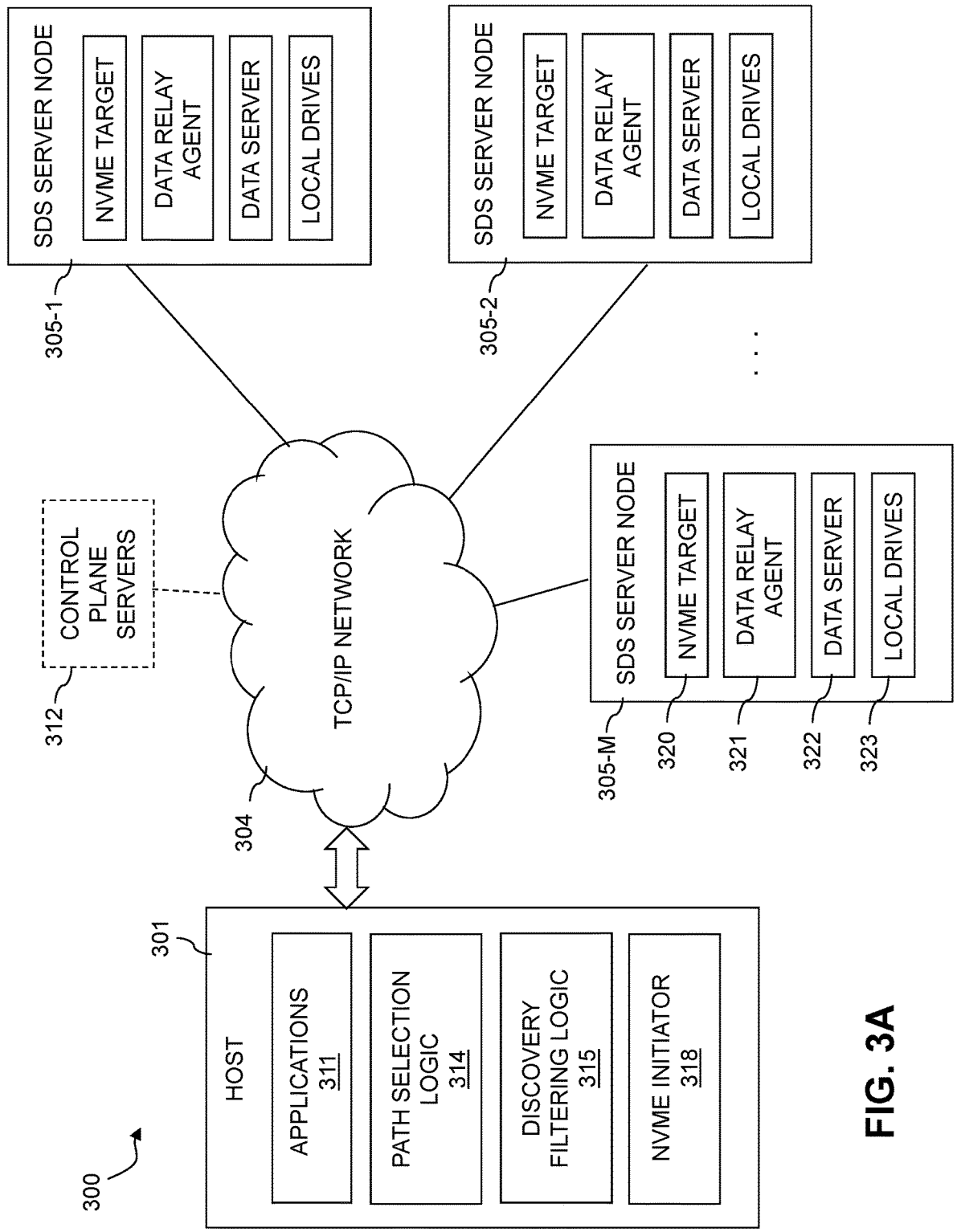
FIG. 3A shows another example of an information processing system incorporating functionality for automated filtering of discovery information in a software-defined storage system in an illustrative embodiment.

Referring initially to FIG. 3A, this embodiment illustrates an example of a distributed storage system that more particularly comprises a software-defined storage system having a plurality of software-defined storage server nodes, also referred to as SDS server nodes, configured to utilize an NVMe storage access protocol such as NVMe-oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 3A, an information processing system 300 comprises a host 301 configured to communicate over a network 304, illustratively a TCP/IP network, with a software-defined storage system comprising a plurality of SDS server nodes 305-1, 305-2, . . . 305-M and corresponding control plane servers 312. The control plane servers 312 are shown in dashed outline as the functionality of such servers in illustrative embodiments is distributed over a particular subset of the SDS server nodes 305 rather than being implemented on separate nodes of the software-defined storage system. The control plane servers 312 provide system management functionality such as centralized storage provisioning, monitoring, membership management, as well as storage partitioning.

A plurality of applications 311 execute on the host 301 and generate IO operations that are delivered to particular ones of the SDS server nodes 305 via at least one NVMe initiator 318. The host 301 further comprises path selection logic 314 and discovery filtering logic 315, illustratively configured to carry out aspects of automated filtering functionality of the host 301 in a manner similar to that previously described. In other embodiments, the discovery filtering logic 315 may be part of the path selection logic 314, rather than a separate component as illustrated in the figure. Both the path selection logic 314 and the discovery filtering logic 315 in some embodiments are implemented at least in part within an MPIO driver of the host 301. Although only a single host 301 is shown in system 300, the system 300 can include multiple hosts, each configured as generally shown for host 301, as in the system 100 of FIG. 1.

Each of the SDS server nodes 305 in the present embodiment comprises at least one NVMe target 320, a data relay agent 321, a data server 322 and a set of local drives 323. The internal components of a given SDS server node with the exception of the local drives 323 are illustratively part of a corresponding storage processor in the FIG. 1 embodiment, although numerous other arrangements are possible.

The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host 301 and the SDS server nodes 305, this is by way of simplified illustration only, and other embodiments can include multiple NVMe initiators within host 301 and multiple NVMe targets within each of the SDS server nodes 305.

In some embodiments, the SDS server nodes 305 are configured at least in part as respective PowerFlex® software-defined storage nodes from Dell Technologies, suitably modified as disclosed herein to include NVMe targets 320, although other types of storage nodes can be used in other embodiments.

The NVMe targets 320 in some embodiments collectively comprise an NVMe subsystem that implements multiple distinct controllers and associated automated filtering of discovery information. For example, a given such NVMe target can comprise at least a first controller associated with a first storage pool of the distributed storage system, and a second controller associated with a second storage pool of the distributed storage system. Other types and arrangements of multiple controllers can be used.

A given one of the SDS server nodes 305 processes IO operations received from the host 301, with different ones of the IO operations being directed by the host 301 from NVMe initiator 318 to different ones of the first and second controllers of the NVMe target 320 of the given SDS server node.

The discovery filtering logic 315 of the host 301 illustratively controls the generation of commands relating to automated filtering of discovery information as disclosed herein. Such commands include the previously-described Set Features command to set contents of a configuration domain filtering feature, which directs the NVMe target 320 of the given SDS server node to filter discovery information that is subsequently provided to the NVMe initiator 318 in response to a Get Log Page command to get a discovery log page.

Figure 3B:
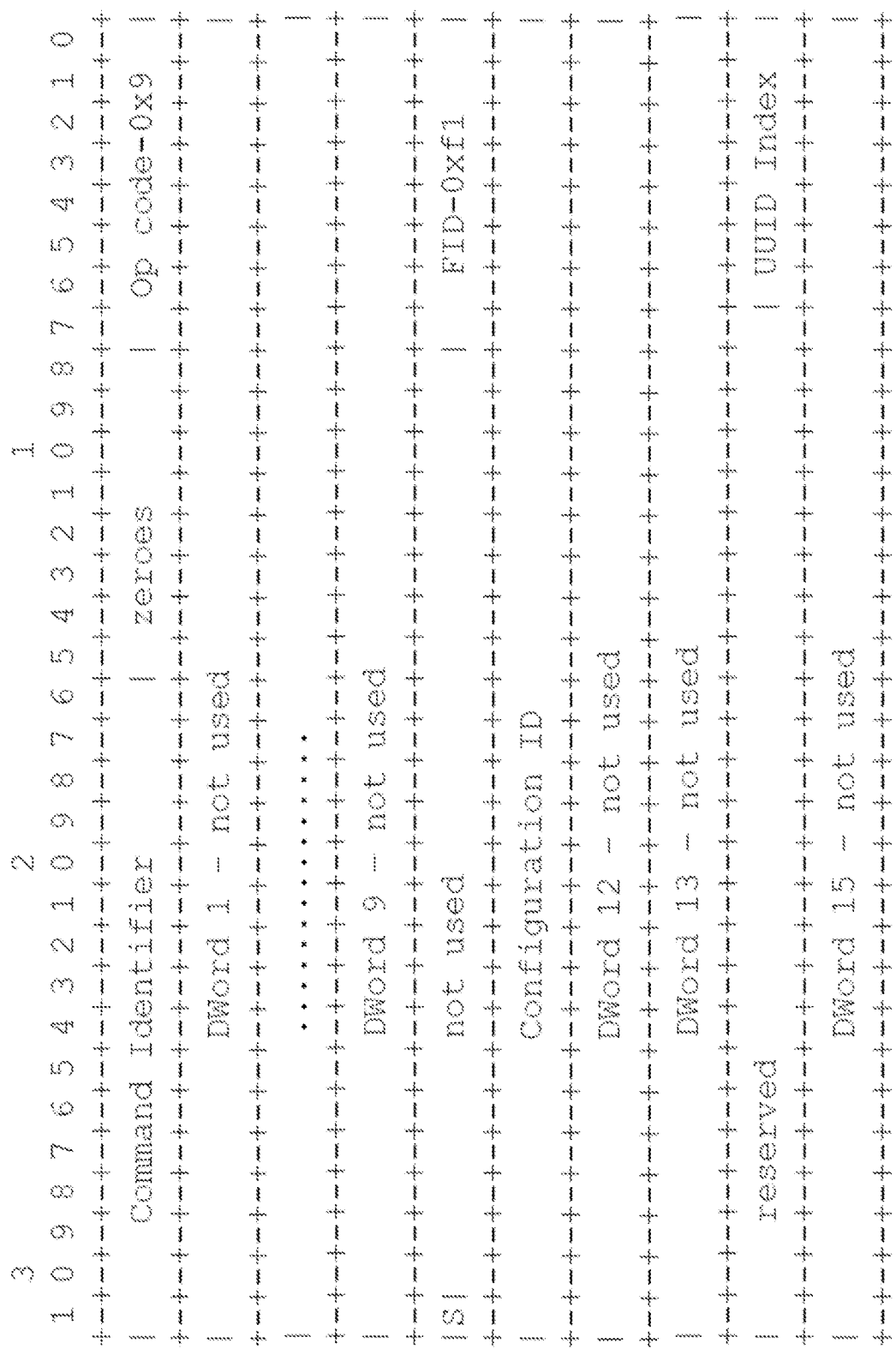
FIGS. 3B and 3C show respective example commands for setting contents of a configuration domain filtering feature and getting contents of a previously-set configuration domain filtering feature in such an embodiment.
Figure 3C:
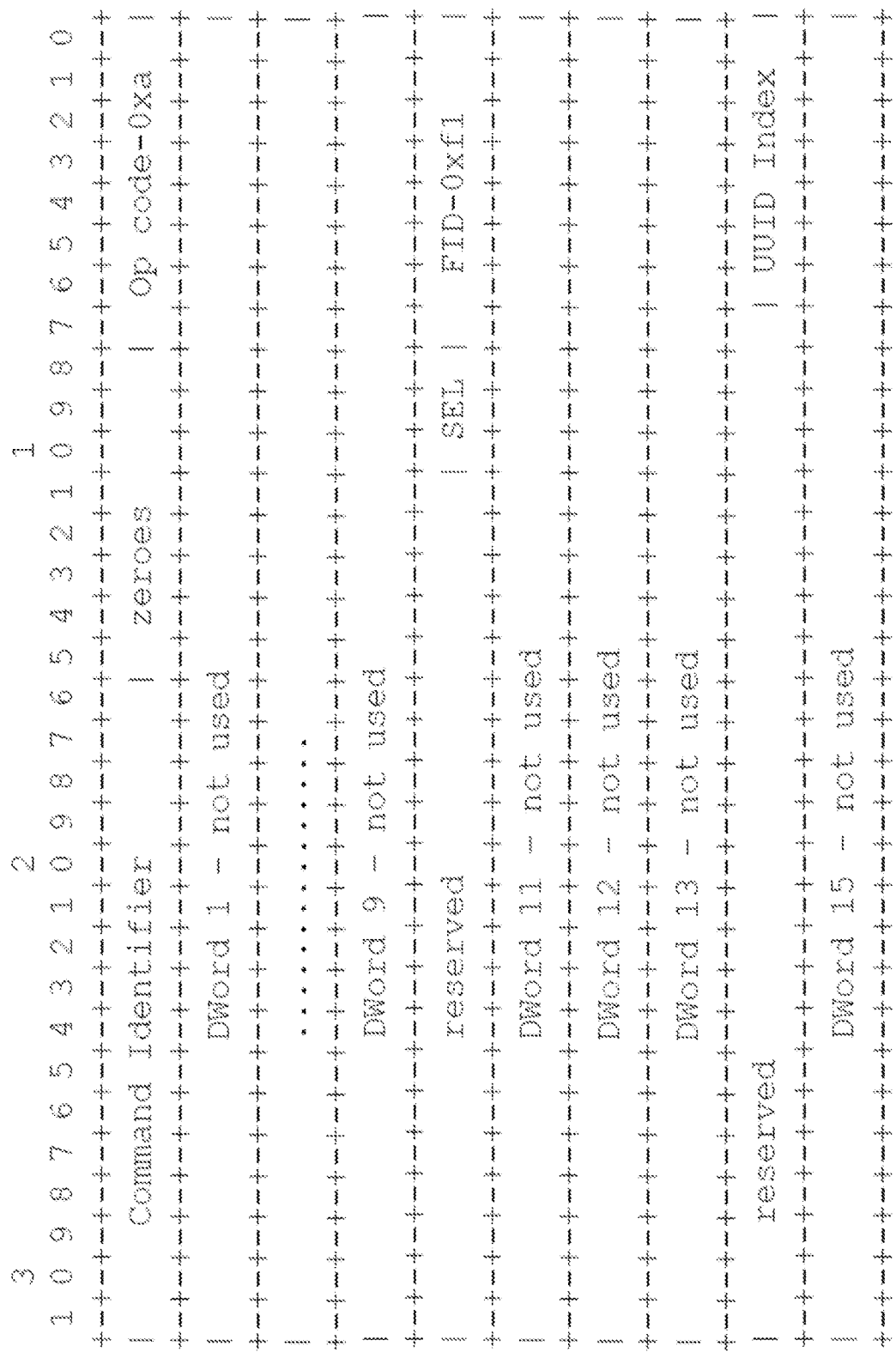

FIGS. 3B and 3C show respective examples of a Set Features command to set contents of a configuration domain filtering feature and a Get Features command to get contents of a configuration domain filtering feature, in an illustrative embodiment.

As illustrated in FIG. 3B, an example Set Features command includes an operation code ("Op code") denoted 0x9, a zeroes portion, a Command Identifier, a number of command data word ("Dword") instances, including Dword 1 through Dword 15, a Save (S) bit, a Universally Unique Identifier (UUID) index, and a Feature Identifier (FID) denoted 0xf1, the latter illustratively identifying a new vendor-specific feature for configuration domain filtering. In this embodiment, a particular one of the command data words, illustratively Dword 11, conveys a 32-bit value of an identifier of a particular configuration domain of the storage system, although more or fewer bits can be used to convey the configuration domain identifier in other embodiments. The 32-bit configuration domain identifier value is denoted as Configuration ID in the figure.

This Set Features command will cause the receiving NVMe target 320 to activate the corresponding configuration domain filtering feature such that it returns only discovery information that is associated with the particular configuration domain to the NVMe initiator 318, for example, in response to a subsequent Get Log Page command received from the NVMe initiator 318.

The Command Identifier, the S bit and the UUID Index are not Features specific but are part of the NVMe specification. The S bit is cleared to zero for this vendor-specific NVMe feature, and the UUID Index is set if supported by the controller, in accordance with the NVMe specification.

Other types and arrangements of commands, fields and storage access protocols can be used in other embodiments. For example, in some embodiments, multiple configuration domain identifiers can be included in one or more Set Features commands, in order to direct the NVMe target to filter out all discovery information other than that associated with the multiple configuration domains specified by the respective multiple configuration domain identifiers included in the command.

Also, in other embodiments, it is possible to invert or otherwise alter the command logic of the example Set Features command described above, such that the NVMe initiator 318 specifies one or more particular configuration domains for which it does not want to receive discovery information, rather than specifying one or more particular configuration domains for which it does want to receive discovery information. This illustratively involves an extension to the command, such as, for example, a parameter in Dword 13 that could be used to specify whether the domain is positive or negative with respect to filtering. One or more other parameters could be used to indicate whether to add or remove a domain.

In some embodiments, the receiving NVMe target 320 more particularly comprises an NVMe discovery controller of the system 300.

In a given such embodiment, the above-described Set Features command to set contents of a configuration domain filtering feature is illustratively recognized by only certain types of targets, such as the NVMe discovery controller. Other targets such as legacy controllers that do not recognize the Set Features command to set contents of a configuration domain filtering feature can possibly reply with an NVMe error status code indicating an "invalid field in command." Such an error status code is illustratively ignored by the NVMe initiator, and the discovery process can continue with the initiator sending a Get Log Page command to get the discovery log page in the usual way. The NVMe discovery controller or other target configured to recognize the Set Features command to set contents of a configuration domain filtering feature will implement automated filtering of discovery information when responding to a Get Log Page command to get a discovery log page.

Referring now to FIG. 3C, an example Get Features command to get contents of a configuration domain filtering feature includes an Op code denoted 0xa, a zeroes portion, a Command Identifier, a number of Dword instances, including Dword 1 through Dword 15, an SEL field, the UUID Index, and the FID denoted 0xf1. The SEL field is set to a zero value to indicate that the current value is to be returned, illustratively via a Completion Queue Entry (CQE) such as that shown in FIG. 3D, in accordance with the NVMe specification.

The example Get Features command of FIG. 3C will illustratively cause the receiving NVMe target 320 to return either the previously-set configuration domain identifier, if the configuration domain filtering feature for that configuration domain identifier is currently set in the NVMe target 320, or a zero value, if the configuration domain filtering feature for that configuration domain identifier is not currently set in the NVMe target 320. Again, other types and arrangements of commands, fields and storage access protocols can be used in other embodiments.

Figure 3D:
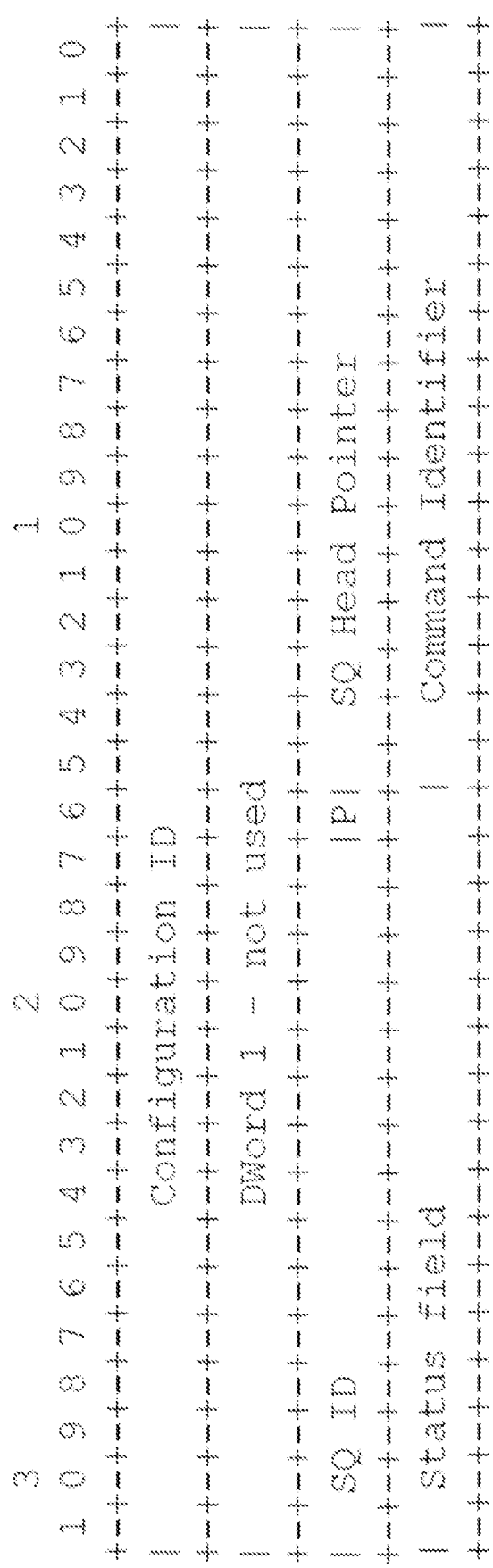
FIG. 3D shows an example Completion Queue Entry (CQE) used to provide a configuration identifier value in response to the command of FIG. 3C. These figures are collectively referred to herein as FIG. 3.

FIG. 3D shows an example CQE used to provide a configuration identifier value in response to the Get Features command of FIG. 3C. The configuration identifier value is a 32-bit value denoted as Configuration ID, in Dword 0. The CQE further comprises a Submission Queue (SQ) ID, a Phase tag (P) bit, an SQ Head Pointer, a Status field and a Command Identifier. The Status field indicates success of the Get Features command. The SQ ID, P bit, SQ Head Pointer, Status field and Command Identifier are not Features specific and are part of the NVMe specification. The P bit is not used with NVMe-oF.

Again, in some embodiments, the above-described Get Features command to get contents of a configuration domain filtering feature is illustratively recognized by only certain types of targets, such as the NVMe discovery controller.

As mentioned above, the FID denoted 0xf1 in these examples is a new vendor-specific FID for a standard Set Features NVMe command, and in some embodiments is supported only on a target that comprises an NVMe discovery controller. It is to be appreciated that the particular FID value used in these examples is illustrative only, and other vendor-specific FID values may be used.

This approach advantageously allows the use of a single shared configuration domain for a large group of NVMe initiators, with each of the initiators in the group receiving the automatically filtered subset of the discovery information having the matching configuration domain identifier.

It is to be appreciated that the particular command formats illustrated in respective FIGS. 3B and 3C are presented by way of illustrative example only, and numerous other formats can be used in other embodiments. In implementing such command functionality, one or more logic instances or other components drivers of the host 301 can be modified to support the particular command formats being utilized. For example, one or more MPIO drivers or other multi-path drivers of the host 301 may be modified as disclosed herein. Additionally or alternatively, other host drivers, such as one or more host NVMe-over-TCP drivers, can be modified to support the functionality disclosed herein. The SDS server nodes 305 are also assumed to be configured to support these example locality command formats, or other similar formats, in illustrative embodiments.

Figure 4A:
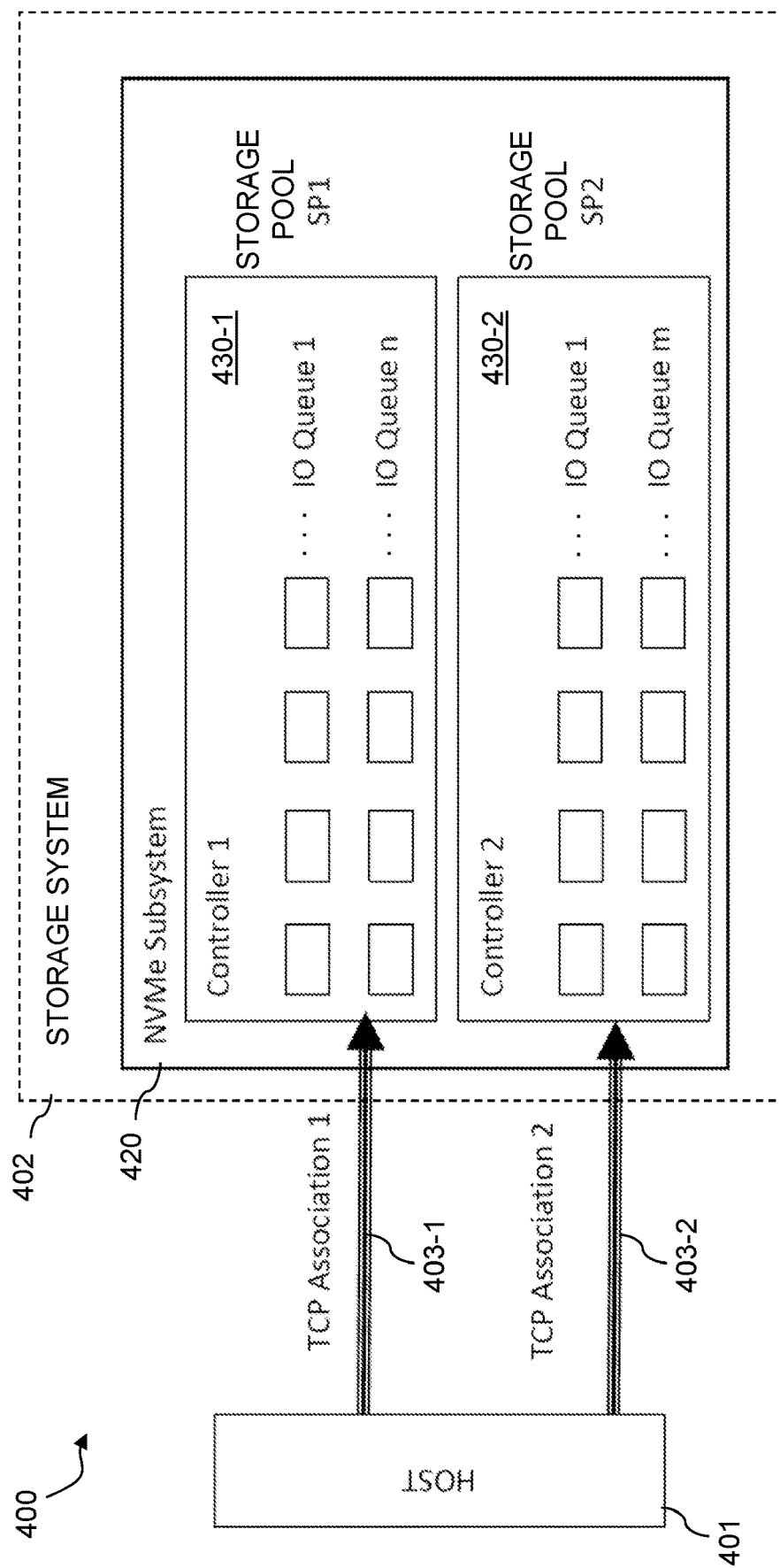
FIG. 4A shows another example of an information processing system incorporating functionality for host-based locality determination and associated path selection in an illustrative embodiment.

FIG. 4A illustrates an example association between different controllers and respective storage pools in one embodiment.

In the FIG. 4A embodiment, an information processing system 400 comprises a host 401 that communicates with a storage system 402 via a plurality of TCP associations including at least a first TCP association 403-1 and a second TCP association 403-2, also denoted as TCP Association 1 and TCP Association 2, respectively. A given such "TCP association" as that term is broadly used herein illustratively comprises one or more TCP connections of an association between a host and a controller. For example, an association between a host and a controller may comprise multiple TCP connections, one for an Admin Queue and one for each of a plurality of IO queues.

The storage system 402 may comprise, for example, a software-defined storage system or other type of distributed storage system, or a non-distributed storage system. Although only a single host 401 is shown in the figure, the system 400 can include multiple hosts.

The storage system 402 comprises an NVMe subsystem 420. The NVMe subsystem 420 is an example of what is more generally referred to herein as a "target" of the storage system 402, and although only a single such target is shown in the figure, the storage system 402 can include multiple such targets, each illustratively implemented as a separate NVMe subsystem.

The NVMe subsystem 420 in this embodiment comprises a first controller 430-1 and a second controller 430-2, also denoted as Controller 1 and Controller 2, respectively. The first controller 430-1 is associated with a first storage pool SP1 of the storage system 402. The second controller 430-2 is associated with a second storage pool SP2 of the storage system 402. In other embodiments, the NVMe subsystem 420 can comprise more than two controllers 430, each associated with one or more storage pools. Accordingly, other embodiments can include only a single storage pool, or can involve different associations between multiple controllers and multiple storage pools. The NVMe subsystem 420 in the present embodiment is illustratively a single physical controller subsystem of the storage system 402, and the first and second controllers 430-1 and 430-2 may be viewed as comprising respective virtual controllers associated with that single physical controller subsystem, although numerous other arrangements are possible in other embodiments.

The storage system 402 processes IO operations received from the host 401 via the TCP associations 403. The host 401 directs IO operations from an NVMe initiator to the first controller 430-1 via the first TCP association 403-1, and directs IO operations from the NVMe initiator to the second controller 430-2 via the second TCP association 403-2.

As illustrated in the figure, the first controller 430-1 comprises a first set of IO queues denoted IO Queue 1 through IO Queue n, and the second controller 430-2 comprises a second set of IO queues denoted IO Queue 1 through IO Queue m, where m may be greater than, equal to or less than n. The capacities of the first and second sets of IO queues of the first and second controllers 430-1 and 430-2 may be made different from one another by configuring those first and second sets of IO queues to have at least one of a different number of IO queues and a different IO queue size relative to one another, although in other embodiments the first and second sets of IO queues may have the same capacity.

In the FIG. 4A embodiment, the NVMe target comprising NVMe subsystem 420 may be configured as a software-defined target or SDT of a software-defined storage system implementation of storage system 402. Such a target can be implemented at least in part as a Linux user space component, illustratively comprising a daemon listening for incoming TCP connections from one or more NVMe initiators of the host 401. The NVMe target comprising NVMe subsystem 420 is accessible from the host 401 via the TCP associations 403, each associated with a different one of the first and second controllers 430-1 and 430-2 of the NVMe subsystem 420.

Figure 4B:
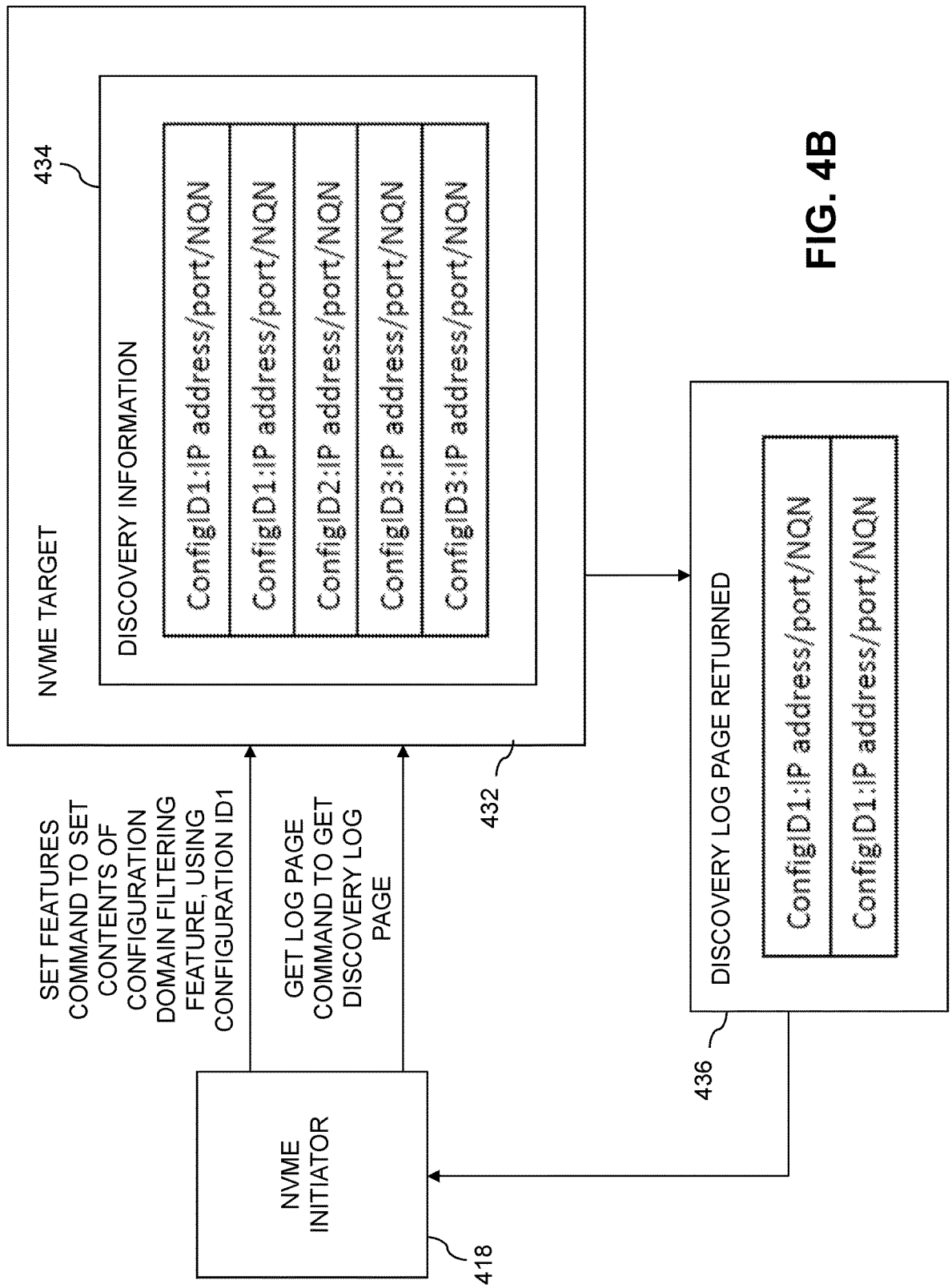
FIG. 4B illustrates an example of automated filtering of discovery information in such a system in an illustrative embodiment. These figures are collectively referred to herein as FIG. 4.

FIG. 4B illustrates the manner in which automated filtering of discovery information is implemented in the system 400.

In this embodiment, an NVMe initiator 418 is assumed to be implemented on host 401. The NVMe initiator 418 generates a Set Features command to set contents of a configuration domain filtering feature, with the Set Features command illustratively configured as shown in FIG. 3B, using a particular configuration domain identifier denoted as ID1. The NVMe initiator 418 sends the Set Features command which specifies the configuration domain having identifier ID1 ("ConfigID1") to a target of the storage system 402, illustratively an NVMe target 432. The NVMe target 432 may comprise, for example, an NVMe discovery controller of the storage system 402. Additionally or alternatively, the NVMe target 432 may correspond, for example, to NVMe subsystem 420 of FIG. 4A, or to another target of the storage system 402.

It is assumed for further description of this embodiment that the NVMe target 432 comprises an NVMe discovery controller that stores discovery information 434 for a plurality of different configuration domains, including the above-noted ConfigID1, as well as two other configuration domains having identifiers ID2 and ID3, with those latter two configuration domains being denoted as ConfigID2 and ConfigID3, respectively, in the figure. In this example, ConfigID1 includes two controllers, each having an IP address, a port identifier and an NVMe qualified name (NQN) as shown. Similarly, ConfigID2 includes a single controller having an IP address, a port identifier and an NON as shown, and ConfigID3 includes two controllers each having an IP address, a port identifier and an NON as shown.

In some embodiments, the NON is the same for every entry of the discovery information 434 and hence is omitted from each individual entry. The IP addresses and ports are not explicitly specified for the various entries in the figure, but will typically include different information for each entry. The ports are illustratively TCP ports.

The NON is an example of what is more generally referred to herein as an "identifier" of a controller of the storage system 402. The discovery information 434 is an example of what is also referred to herein as "available discovery information" of the NVMe target 432. It is to be appreciated that a wide variety of different types and arrangements of discovery information can be used in other embodiments.

In response to receipt of the above-described Set Features command specifying ConfigID1, the NVMe target 432 establishes a configuration domain filtering instance in the storage system 402, illustratively by activating a configuration domain filtering feature of the storage system 402, utilizing the specified ConfigID1, for subsequent provision of filtered discovery information from the NVMe target 432 to the NVMe initiator 418.

The establishment of the configuration domain filtering instance for NVMe initiator 418 illustratively involves storing, in association with an identifier of that initiator, an indication that configuration domain filtering has been activated for that initiator in NVMe target 432 using specified ConfigID1, meaning in this embodiment that the NVMe target 432 will filter out all discovery information other than that discovery information associated with ConfigID1 before reporting discovery information to NVMe initiator 418.

The NVMe target 432 therefore automatically filters discovery information for delivery to the NVMe initiator 418 in accordance with the established configuration domain filtering instance. This is illustrated in the figure by the discovery log page 436 returned by the NVMe target 432 to the NVMe initiator 418 in response to a Get Log Page command to get the discovery log page, received by the NVMe target 432 from the NVMe initiator 418. As can be seen in the figure, the discovery log page 436 returned from the NVMe target 432 to the NVMe initiator 418 includes a subset of the discovery information 434 of the NVMe target 432, with the subset including those portions of the discovery information 434 associated with the specified configuration domain ConfigID1 and excluding those portions of the discovery information 434 not associated with the configuration domain ConfigID1. The latter includes the discovery information associated with the configuration domains ConfigID2 and ConfigID3, which is filtered out by the NVMe target 432 and therefore not included in the discovery log page 436 returned to the NVMe initiator 418, in accordance with the configuration domain filtering instance established by the NVMe target 432 for the NVMe initiator 418. The discovery log page 436 returned to the NVMe initiator 418 thus includes only those portions of discovery information 434 that are associated with the configuration domain ConfigID1 specified by the NVMe initiator 418 in its Set Features command to set contents of a configuration domain filtering feature.

Figure 5:
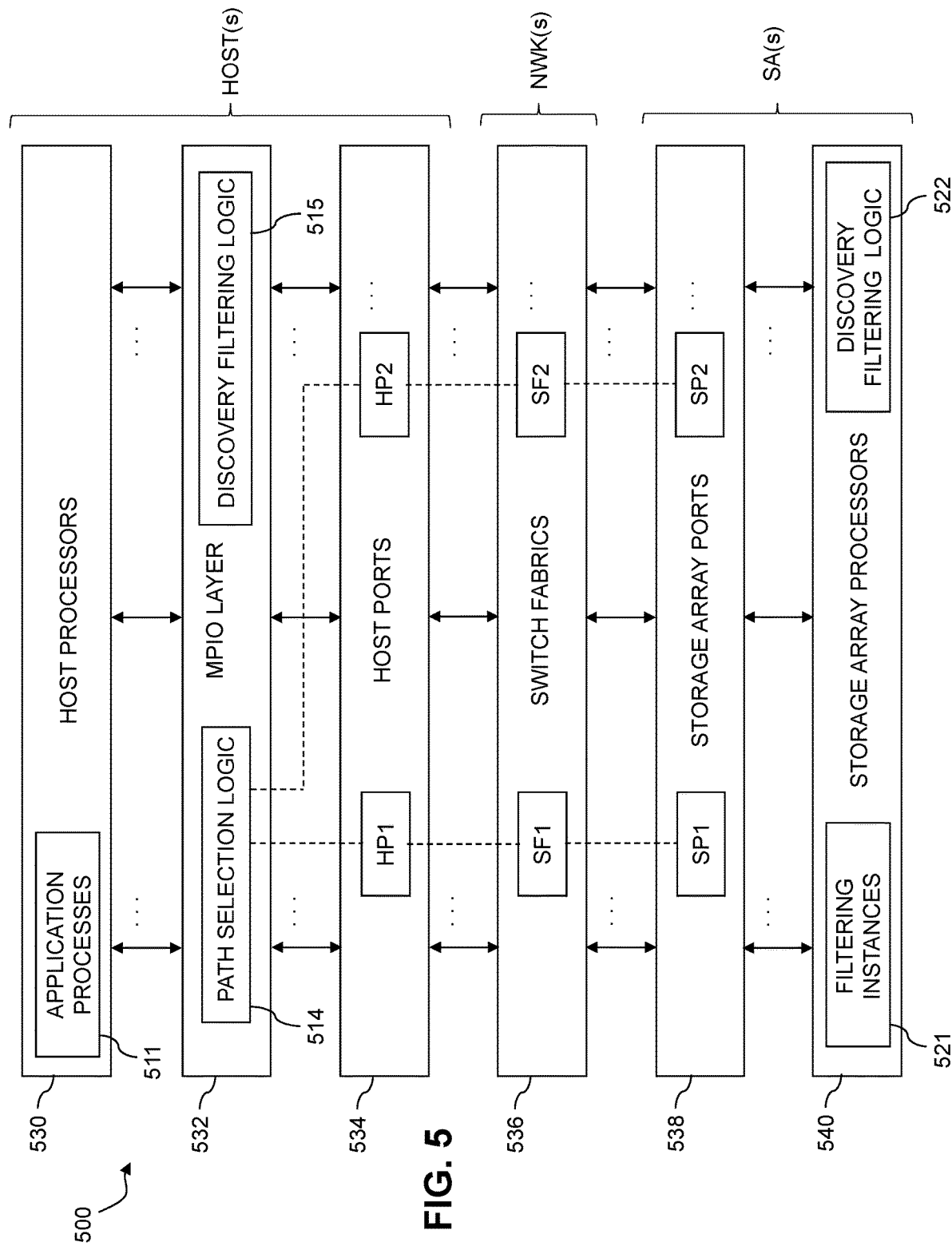
FIG. 5 shows a further example of an information processing system incorporating functionality for automated filtering of discovery information in an illustrative embodiment.

Referring now to FIG. 5, another illustrative embodiment is shown. In this embodiment, an information processing system 500 comprises host-side elements that include application processes 511, path selection logic 514 and discovery filtering logic 515, and storage-side elements that include filtering instances 521 and discovery filtering logic 522. The path selection logic 514 is configured to operate in conjunction with discovery filtering logic 515, filtering instances 521 and discovery filtering logic 522 to implement functionality for automated filtering of discovery information in the system 500. There may be separate instances of one or more such elements associated with each of a plurality of system components such as hosts and storage arrays of the system 500. For example, different instances of the path selection logic 514 are illustratively implemented within or otherwise in association with respective ones of a plurality of MPIO drivers of respective hosts.

The system 500 is configured in accordance with a layered system architecture that illustratively includes a host processor layer 530, an MPIO layer 532, a host port layer 534, a switch fabric layer 536, a storage array port layer 538 and a storage array processor layer 540. The host processor layer 530, the MPIO layer 532 and the host port layer 534 are associated with one or more hosts, the switch fabric layer 536 is associated with one or more SANs or other types of networks, and the storage array port layer 538 and storage array processor layer 540 are associated with one or more storage arrays ("SAs"). A given such storage array illustratively comprises a software-defined storage system or other type of distributed storage system comprising a plurality of storage nodes.

In a manner similar to that described elsewhere herein, one or more storage arrays of the system 500 are each configured to implement at least one storage-side target that includes multiple controllers, such as, for example, at least a first controller associated with a first storage pool, and a second controller associated with a second storage pool, where the first and second controllers are illustratively part of different configuration domains.

In some embodiments, at least one target implemented in the system 500 comprises an NVMe discovery controller of the type described elsewhere herein.

The one or more storage arrays implement automated filtering of discovery information provided by targets of the one or more storage arrays to initiators of one or more hosts. For example, Set Features commands to set contents of configuration domain filtering features are illustratively generated by or otherwise under the control of the host-side discovery filtering logic 515 and sent over paths selected by the path selection logic 514 to targets of the one or more storage arrays. Corresponding filtering instances 521 are established by the one or more storage arrays for respective ones of the initiators using configuration domains specified by those initiators in their respective Set Features commands.

Automated filtering of discovery information delivered to those initiators is implemented under the control of the discovery filtering logic 522 in accordance with the filtering instances 521. For example, each initiator is illustratively returned in a given discovery log page from one of the targets only those portions of the discovery information of the target that relate to the one or more specified configuration domains of the initiator, as reflected in the filtering instances 521. The filtered discovery information returned to a given initiator is illustratively utilized by the path selection logic to establish paths to the controllers associated with the one or more specified configuration domains.

The system 500 in this embodiment therefore implements automated filtering functionality utilizing one or more MPIO drivers of the MPIO layer 532, and associated instances of path selection logic 514 and discovery filtering logic 515, as well as the filtering instances 521 and the discovery filtering logic 522.

The one or more storage arrays also process IO operations received from one or more hosts, with different ones of the IO operations being directed by the one or more hosts under the control of path selection logic 514 from one or more initiators of the one or more hosts to different ones of the first and second controllers of the target in a given storage array.

For example, in some embodiments, a given one of the hosts of the system 500 is illustratively configured to utilize filtered discovery information, obtained using the automated filtering techniques disclosed herein, to establish a plurality of paths between at least one initiator (e.g., an NVMe initiator) of the given host and a plurality of targets (e.g., NVME targets) of respective storage nodes. For each of a plurality of IO operations generated by one or more of the application processes 511 in the given host for delivery to the given storage array, the given host selects, illustratively via path selection logic 514 of one or more MPIO drivers of the MPIO layer 532, a particular one of the plurality of paths from the initiator to one of the targets on the particular storage node, and sends the IO operation to the particular storage node over the selected path.

The application processes 511 generate IO operations that are processed by the MPIO layer 532 for delivery to the one or more storage arrays that collectively comprise a plurality of storage nodes of a distributed storage system. Paths are determined by the path selection logic 514 for sending such IO operations to the one or more storage arrays, utilizing filtered discovery information previously obtained by initiators of the one or more hosts. These IO operations are sent to the one or more storage arrays in accordance with one or more scheduling algorithms, load balancing algorithms and/or other types of algorithms.

The MPIO layer 532 is an example of what is also referred to herein as a multi-path layer, and comprises one or more MPIO drivers implemented in respective hosts. Each such MPIO driver illustratively comprises respective instances of path selection logic 514 and discovery filtering logic 515 configured as previously described. Additional or alternative layers and logic arrangements can be used in other embodiments.

The filtering instances 521 implemented in the storage array processor layer 540 illustratively comprise, for respective initiators, stored information including indicators of whether or not a configuration domain filtering feature has been set for that initiator, and one or more specified configuration domains that are to be used in the filtering of discovery information for delivery to that initiator.

As mentioned above, in the system 500, path selection logic 514 is configured to select different paths for sending IO operations from a given host to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more hosts and the one or more storage arrays, depending upon the specific system configuration and its deployed numbers of host ports, switch fabrics and storage array ports. For example, each host in the FIG. 5 embodiment can illustratively have the same number and type of paths to a shared storage array, or alternatively different ones of the hosts can have different numbers and types of paths to the storage array.

The path selection logic 514 of the MPIO layer 532 in this embodiment selects paths for delivery of IO operations to the one or more storage arrays having the storage array ports of the storage array port layer 538. More particularly, the path selection logic 514 determines appropriate paths over which to send particular IO operations to particular logical storage devices of the one or more storage arrays.

Some implementations of the system 500 can include a relatively large number of hosts (e.g., 1000 or more hosts), although as indicated previously different numbers of hosts, and possibly only a single host, may be present in other embodiments. Each of the hosts is typically allocated a sufficient number of host ports to accommodate predicted performance needs. In some cases, the number of ports per host is on the order of 4, 8 or 16, although other numbers of ports could be allocated to each host depending upon the predicted performance needs. A typical storage array may include on the order of 128 ports, although again other numbers can be used based on the particular needs of the implementation. The number of hosts per storage array port in some cases can be on the order of 10 hosts per port.

A given host of system 500 can be configured to initiate an automated path discovery process to discover new paths responsive to updated zoning and masking or other types of storage system reconfigurations performed by a storage administrator or other user. For certain types of hosts, such as hosts using particular operating systems such as Windows, ESX or Linux, automated path discovery via the MPIO drivers of a multi-path layer is typically supported. Other types of hosts using other operating systems such as AIX in some implementations do not necessarily support such automated path discovery, in which case alternative techniques can be used to discover paths.

These and other features of illustrative embodiments disclosed herein are examples only, and should not be construed as limiting in any way. Other types of automated filtering of discovery information can be used in other embodiments, and the term "automated filtering" as used herein is intended to be broadly construed.

The above-described illustrative embodiments can provide significant advantages over conventional approaches.

For example, some embodiments provide techniques for automated filtering of discovery information, in a software-defined storage system or other type of distributed storage system, illustratively utilizing specified configuration domains.

Such embodiments reduce the complexity of the discovery process, particularly in implementations using advanced storage access protocols such as NVMe-oF or NVMe/TCP, at least in part by substantially reducing the burdens associated with maintaining and updating discovery information in a distributed storage system.

For example, the disclosed techniques can allow the use of a single shared configuration domain for a large group of NVMe initiators, with each of the initiators in the group receiving the automatically filtered subset of the discovery information having the matching configuration domain identifier.

Illustrative embodiments can advantageously avoid the need to configure NVMe targets separately for every storage-accessing host.

Furthermore, some embodiments can be implemented without requiring any change in the NVMe specification or other storage access protocol specification.

Some embodiments can significantly improve the scalability of distributed storage systems accessed by NVMe initiators as well as the adaptivity of such systems to various types of reconfiguration.

Illustrative embodiments facilitate the deployment of multiple configuration domains in a distributed storage system, such as protection domains, security domains and/or other types of domains.

Moreover, these and other embodiments can help to improve overall system performance by significantly enhancing the efficiency of the storage target discovery process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with automated filtering functionality will now be described in greater detail with reference to FIGS. 6 and 7. Although described in the context of system 100, these platforms may also be used to implement at least portions of other information processing systems in other embodiments.

Figure 6:
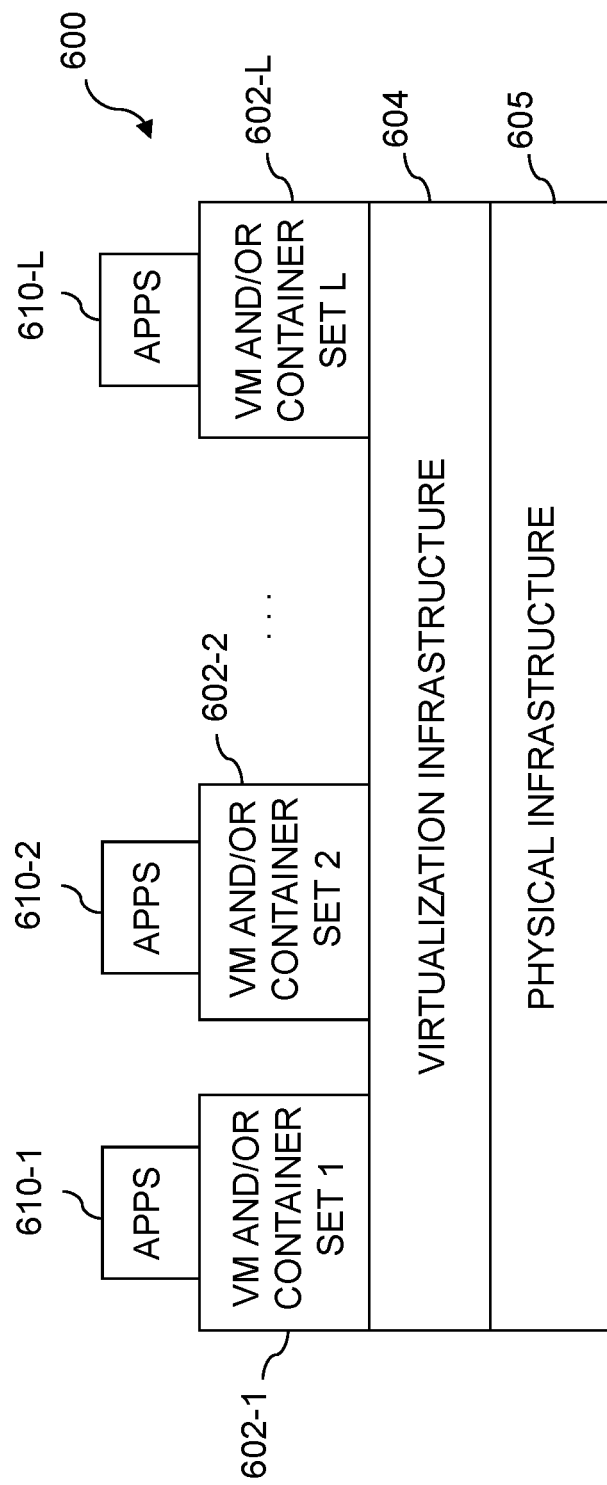
FIGS. 6 and 7 show examples of processing platforms that may be utilized to implement at least a portion of an information processing system in illustrative embodiments.
Figure 7:
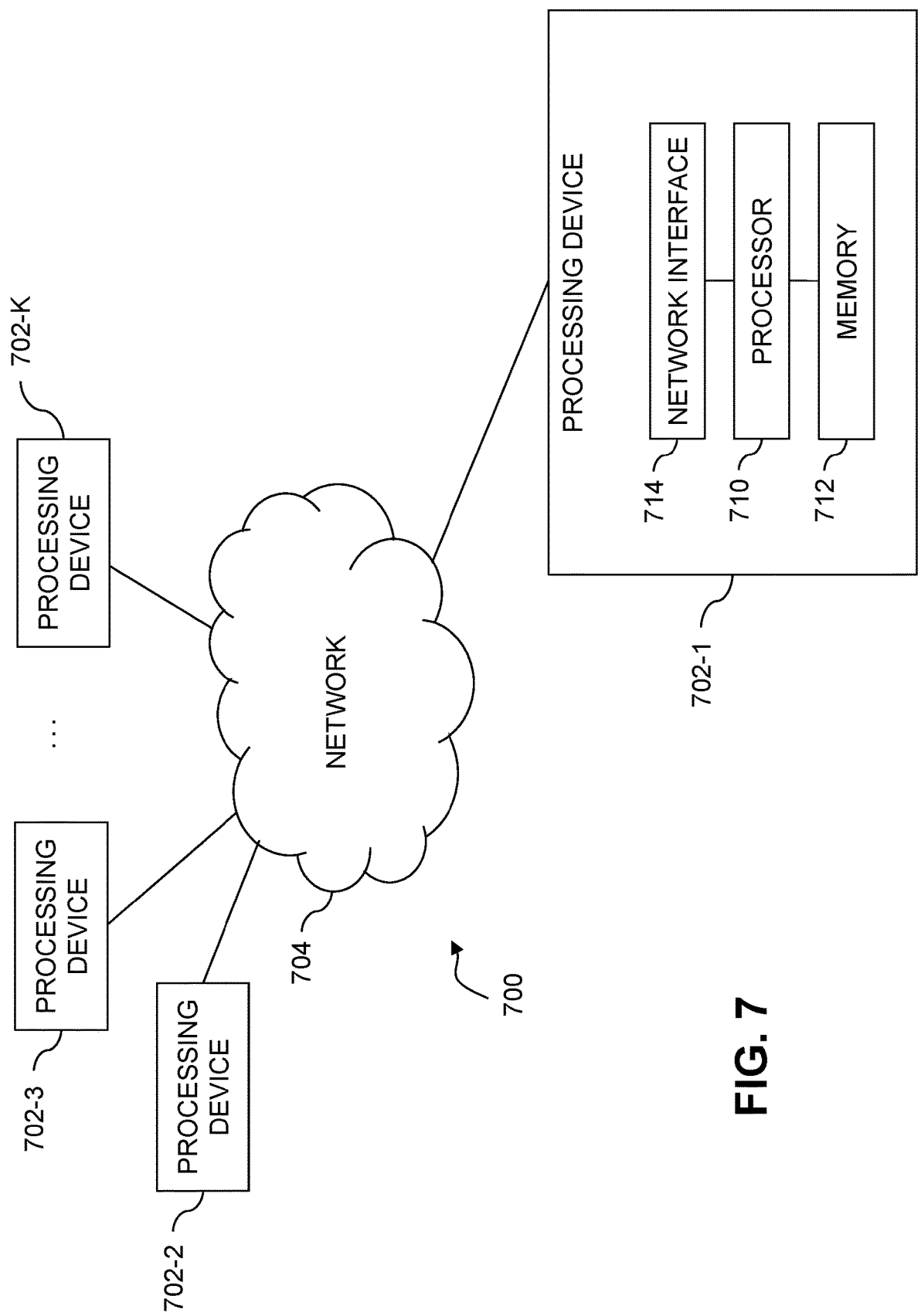

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide automated filtering functionality in a distributed storage system of the type described above using one or more processes running on a given one of the VMs. For example, each of the VMs can implement logic instances and/or other components for implementing functionality associated with automated filtering of discovery information in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide automated filtering functionality in a distributed storage system of the type described above. For example, a container host supporting multiple containers of one or more container sets can implement logic instances and/or other components for implementing functionality associated with automated filtering of discovery information in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the automated filtering functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors, initiators, targets, path selection logic instances, discovery filtering logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive in a storage system from a given host a command providing a configuration domain identifier specifying a corresponding one of a plurality of configuration domains of the storage system;
   to establish a configuration domain filtering instance in the storage system responsive to the received command; and
   to automatically filter discovery information for delivery from the storage system to at least one host including the given host in accordance with the established configuration domain filtering instance;
   wherein the storage system stores discovery information indexed at least in part by a plurality of configuration domain identifiers, including the configuration domain identifier previously provided by the given host in the command, for respective ones of the plurality of configuration domains; and
   wherein automatically filtering discovery information comprises:
   receiving an additional command, from the given host, requesting discovery information, the additional command comprising a request for a discovery log page;
   identifying a particular subset of the stored discovery information corresponding to the configuration domain identifier previously provided by the given host; and
   returning the identified subset of the stored discovery information to the given host in the discovery log page in response to the additional command;
   wherein the identified subset of the stored discovery information comprises a first amount of discovery information, the first amount of discovery information being less than a second amount of discovery information that would have been provided without the automatically filtering; and
   wherein in response to receipt of another command, different than the command providing the configuration domain identifier and different than the additional command, received in the storage system from the given host, the previously-provided configuration domain identifier is returned from the storage system to the given host.

2. The apparatus of claim 1 wherein the at least one processing device comprises at least a portion of the storage system.

3. The apparatus of claim 1 wherein the storage system comprises a distributed storage system that includes a plurality of storage nodes.

4. The apparatus of claim 3 wherein the distributed storage system comprises a software-defined storage system and the storage nodes comprise respective software-defined storage server nodes of the software-defined storage system.

5. The apparatus of claim 1 wherein each of the configuration domains comprises one or more logical storage volumes.

6. The apparatus of claim 1 wherein the command is received in a target of the storage system from an initiator of the given host.

7. The apparatus of claim 1 wherein establishing a configuration domain filtering instance in the storage system responsive to the received command comprises activating a configuration domain filtering feature of the storage system, based at least in part on the provided configuration domain identifier, for subsequent provision of filtered discovery information from a target of the storage system to an initiator of the given host.

8. The apparatus of claim 7 wherein the target comprises a Non-Volatile Memory Express (NVMe) discovery controller of the storage system.

9. The apparatus of claim 7 wherein the target comprises multiple controllers of the storage system.

10. The apparatus of claim 1 wherein automatically filtering discovery information for delivery from the storage system to at least one host in accordance with the established configuration domain filtering instance comprises sending from a target of the storage system to an initiator of the given host a subset of available discovery information of the target, the subset including portions of the available discovery information associated with the one or more specified configuration domains and excluding portions of the available discovery information not associated with the one or more specified configuration domains.

11. The apparatus of claim 1 wherein a target of the storage system receives the command from an initiator of the given host, and the target subsequently receives from the initiator the additional command, and wherein automatically filtering discovery information for delivery from the storage system to at least one host in accordance with the established configuration domain filtering instance comprises returning in response to the additional command only those portions of available discovery information of the target that are associated with the one or more specified configuration domains.

12. The apparatus of claim 11 wherein the additional command comprises a Get Log Page command to get the discovery log page.

13. The apparatus of claim 11 wherein the portions of available discovery information of the target that are associated with the one or more specified configuration domains are returned to the initiator in the discovery log page.

14. The apparatus of claim 1 wherein the discovery information comprises at least an Internet Protocol (IP) address and a port identifier.

15. A computer program product comprising a non-transitory processor-readable storage medium having stored therein program code of one or more software programs, wherein the program code when executed by at least one processing device comprising a processor coupled to a memory, causes the at least one processing device:
  to receive in a storage system from a given host a command providing a configuration domain identifier specifying a corresponding one of a plurality of configuration domains of the storage system;
  to establish a configuration domain filtering instance in the storage system responsive to the received command; and
  to automatically filter discovery information for delivery from the storage system to at least one host including the given host in accordance with the established configuration domain filtering instance;
  wherein the storage system stores discovery information indexed at least in part by a plurality of configuration domain identifiers, including the configuration domain identifier previously provided by the given host in the command, for respective ones of the plurality of configuration domains; and
  wherein automatically filtering discovery information comprises:
  receiving an additional command, from the given host, requesting discovery information, the additional command comprising a request for a discovery log page;
  identifying a particular subset of the stored discovery information corresponding to the configuration domain identifier previously provided by the given host; and
  returning the identified subset of the stored discovery information to the given host in the discovery log page in response to the additional command;
  wherein the identified subset of the stored discovery information comprises a first amount of discovery information, the first amount of discovery information being less than a second amount of discovery information that would have been provided without the automatically filtering; and
  wherein in response to receipt of another command, different than the command providing the configuration domain identifier and different than the additional command, received in the storage system from the given host, the previously-provided configuration domain identifier is returned from the storage system to the given host.

16. The computer program product of claim 15 wherein establishing a configuration domain filtering instance in the storage system responsive to the received command comprises activating a configuration domain filtering feature of the storage system, based at least in part on the provided configuration domain identifier, for subsequent provision of filtered discovery information from a target of the storage system to an initiator of the given host.

17. The computer program product of claim 15 wherein a target of the storage system receives the command from an initiator of the given host, and the target subsequently receives from the initiator the additional command, and wherein automatically filtering discovery information for delivery from the storage system to at least one host in accordance with the established configuration domain filtering instance comprises returning in response to the additional command only those portions of available discovery information of the target that are associated with the one or more specified configuration domains.

18. A method comprising:
  receiving in a storage system from a given host a command providing a configuration domain identifier specifying a corresponding one of a plurality of configuration domains of the storage system;
  establishing a configuration domain filtering instance in the storage system responsive to the received command; and
  automatically filtering discovery information for delivery from the storage system to at least one host including the given host in accordance with the established configuration domain filtering instance;
  wherein the storage system stores discovery information indexed at least in part by a plurality of configuration domain identifiers, including the configuration domain identifier previously provided by the given host in the command, for respective ones of the plurality of configuration domains;
  wherein automatically filtering discovery information comprises:
  receiving an additional command, from the given host, requesting discovery information, the additional command comprising a request for a discovery log page;
  identifying a particular subset of the stored discovery information corresponding to the configuration domain identifier previously provided by the given host; and
  returning the identified subset of the stored discovery information to the given host in the discovery log page in response to the additional command;
  wherein the identified subset of the stored discovery information comprises a first amount of discovery information, the first amount of discovery information being less than a second amount of discovery information that would have been provided without the automatically filtering;
  wherein in response to receipt of another command, different than the command providing the configuration domain identifier and different than the additional command, received in the storage system from the given host, the previously-provided configuration domain identifier is returned from the storage system to the given host; and
  wherein the method is performed by at least one processing device comprising a processor coupled to a memory.

19. The method of claim 18 wherein establishing a configuration domain filtering instance in the storage system responsive to the received command comprises activating a configuration domain filtering feature of the storage system, based at least in part on the provided configuration domain identifier, for subsequent provision of filtered discovery information from a target of the storage system to an initiator of the given host.

20. The method of claim 18 wherein a target of the storage system receives the command from an initiator of the given host, and the target subsequently receives from the initiator the additional command, and wherein automatically filtering discovery information for delivery from the storage system to at least one host in accordance with the established configuration domain filtering instance comprises returning in response to the additional command only those portions of available discovery information of the target that are associated with the one or more specified configuration domains.

* * * * *